United States Patent [19]
Donskoy

[11] Patent Number: 5,233,570
[45] Date of Patent: Aug. 3, 1993

[54] LOW FREQUENCY UNDERWATER ACOUSTIC RADIATOR

[76] Inventor: Dimitri M. Donskoy, 613 Hudson St., Hoboken, N.J. 07030

[21] Appl. No.: 929,318

[22] Filed: Aug. 13, 1992

[51] Int. Cl.$^5$ .......................................... H04R 23/00
[52] U.S. Cl. .................... 367/142; 367/141; 367/176; 181/110; 181/121; 181/142
[58] Field of Search .............. 367/141, 142, 143, 171, 367/176, 191, 910; 181/110, 121, 142, 402

[56] References Cited

U.S. PATENT DOCUMENTS

| | | | |
|---|---|---|---|
| 4,85,726 | 12/1989 | Myers | 367/142 |
| 1,791,014 | 2/1931 | Settegast et al. | 181/140 |
| 3,143,999 | 8/1964 | Bouyoucos | 116/137 |
| 3,277,437 | 10/1966 | Bouyoucos | 340/12 |
| 3,403,374 | 9/1968 | Mellen et al. | 340/8 |
| 3,610,366 | 10/1971 | Goldberg | 181/0.5 |
| 3,741,333 | 6/1973 | Muniz et al. | 367/142 |
| 4,142,171 | 2/1979 | Pickens | 367/142 |
| 4,153,134 | 5/1979 | Yang | 181/120 |

Primary Examiner—J. Woodrow Eldred
Attorney, Agent, or Firm—Cobrin Gittes & Samuel

[57] ABSTRACT

Low frequency underwater acoustic radiator apparatus includes an air-trapping chamber with a lower portion open to the water, characterized by a mean density higher than that of water. A closed, rigid float element having a mean density equal to or lower than that of water is disposed with a selected loose fit within the chamber. When the chamber and float combination are submerged in water with a substantially vertical orientation of the chamber, the float element floats within the chamber, with the trapped air functioning as a spring coupling. A vibromotive element is coupled to the float element or the chamber element to induce oscillation of the coupled element. The coupling of the chamber and the float by the air spring converts the dipole oscillation of the oscillating element into a monopole pulsation suitable for a low frequency underwater sound radiator. The resonant frequency of the assembly can be changed by altering the volume of air in the chamber, or by changing the depth at which the device is submerged.

19 Claims, 2 Drawing Sheets

LOW FREQUENCY UNDERWATER ACOUSTIC RADIATOR

BACKGROUND OF THE INVENTION

This invention relates generally to underwater acoustic signal generators, and, more particularly, relates to undersea apparatus and methods for generating acoustic signals with high source level, efficiency and reliability.

The advent of new oceanographic research fields such as acoustic tomography, the expansion of existing fields such as marine geology and mineral resource exploration, and the development of new applications such as a proposed global ocean warming monitoring system and an ultra-distant early warning submarine detection sonar system, require the generation of powerful and reliable low frequency underwater sound radiators that operate in the frequency range below one thousand hertz.

In order to be effective, such radiators must function reliably for years without preventive maintenance, and must provide a high source level and broadband frequency performance, and must be submersible to significant ocean depths, on the order of one thousand meters. Combining all of these requirements in one radiator in the frequency range below 1,000 Hz presents a set of difficult and often conflicting tasks.

The following patents and publications provide examples of undersea acoustic radiators:

| U.S. Pat. No. | Patentee |
| --- | --- |
| 1,791,014 | Settegast et al. |
| 3,143,999 | Bouyoucos |
| 3,277,437 | Bouyoucos |
| 3,403,374 | Mellen et. al. |
| 3,610,366 | Goldberg |

J. E. Blue et al., "A Low-Frequency, Tow-Powered Sound Source", Power Transducers for Sonics and Ultrasonics, Proceedings of the International Workshop held in Toulon, France, June 12 and 13, 1990, B. F. Hamonic et al., ed., Springer-Verlag, pub., pp. 178-185.
F. Massa, "Sonar Transducers: A History", Sea Technology, November 1989.
O. B. Wilson, Introduction to Theory and Design of Sonar Transducers, 1988, Chapters 6 and 10 (pp. 109-125 and 171-182).

The conventional undersea acoustic radiators discussed in the above-listed publications, however, suffer from a number of deficiencies. One of the major drawbacks is low reliability associated with fatigue failures due to large deformations of the radiation sources, or excess friction from seal elements employed between a piston and a chamber.

In particular, the above-listed publications show that high acoustic power output for a small (compared to the sound wavelength) radiator can be achieved using a resonant monopole-type transducer at a large volume velocity, with large deformation of the radiating surface of the transducer. However, this characteristic is antithetical to the requirement of high reliability, in that large deformations lead to fatigue failures.

Moreover, the requirement of resonant transducer design, necessitated by high source levels, contradicts the desired characteristic of broadband frequency performance. As frequency decreases, it becomes even more difficult to satisfy these contradictory requirements using traditional reversible types of transducers, such as the electromagnetic, magnetostrictive, and piezoelectric transducers.

Accordingly, the development of transducers that can satisfy these conflicting requirements at low frequencies is a longstanding and challenging problem.

It is accordingly an object of the invention to provide improved low frequency underwater acoustic radiation methods and apparatus.

It is another object of the invention to provide undersea low frequency acoustic radiation methods and apparatus affording high source level and high reliability.

It is a further object of the invention to provide acoustic radiation methods and apparatus that enable control and change of resonant frequency to attain broadband frequency performance.

Other general and specific objects of the invention will in part be obvious and will in part appear hereinafter.

SUMMARY OF THE INVENTION

The foregoing objects are attained by the invention, which provides low frequency acoustic radiator methods and apparatus adapted for submerged operation in water. One aspect of the invention includes a pulsator assembly for generating a monopole pulsation from a dipole oscillation. The pulsator assembly contains a chamber element, a substantially rigid float element disposed within the chamber element, a spring element interposed between the chamber element and the float element, and a vibromotive element coupled to the float element or to the chamber for imparting a vibromotive force with a vertical component to the coupled element to generate vertical oscillation of the coupled element.

The chamber has a top portion, a bottom portion, and a side wall portion. The chamber is open at the bottom portion and closed at the top portion. The top portion and the side walls define a cavity adapted for trapping a volume of air when the chamber is submerged in water with a selected first substantially vertical orientation with the bottom portion below the top portion. The chamber has a mean density higher than that of water so that the chamber sinks in water.

The float is disposed within the cavity with a selected loose fit. The float has a mean density equal to or lower than that of water, so that when the chamber and the float are submerged in water in the selected first substantially vertical orientation, the float element is buoyant and floats within the chamber element.

The spring element is interposed between the top portion of the chamber and the float for generating a spring force between the top portion of the chamber and the float, so that the chamber and the float are coupled through the spring element. As discussed in greater detail hereinafter, as a result of this coupling, the substantially vertical dipole oscillation of the float acts upon the chamber through the spring element to generate a monopole pulsation of the pulsator assembly, so that dipole oscillation of the float is converted to monopole pulsation of the pulsator assembly.

The substantially vertical orientation of the chamber is maintained by coupling ballast to the exterior of the chamber to establish a center of mass for the pulsator assembly along an axis lower than the geometric center of the pulsator assembly.

The vibromotive element can include any of an electric motor vibrator, a linear motor, a low frequency electromagnetic or electrodynamic force exciter, or a hydraulic or pneumatic vibrator.

In another aspect of the invention, the vibromotive element includes elements for converting hydrodynamic excitation from water flow around the pulsator assembly, which may occur during towing or other external translational movement of the pulsator assembly, into vibromotive force.

The spring element can include a coil spring or other separate compression spring. Alternatively, the spring element can be simply the volume of trapped air.

Another aspect of the invention provides methods and apparatus for changing the resonant frequency of the pulsator element. When air is employed as the spring medium between the float and the chamber, the resonant frequency of the pulsator element can be controlled simply by changing the depth at which the device is submerged. Moreover, the resonant frequency can be varied by changing the volume of air trapped in the cavity between the float and the chamber, such as by employing conduit elements for introducing air into or releasing air from the cavity from an external air source.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

As noted above, a principal cause of the unreliability of low frequency radiators is the large deformations of the radiating surface or its suspension, which leads to fatigue failures of the materials. However, to generate a high source level of sound it is necessary to create a large displacement of the radiating surface.

In order to satisfy the two conflicting requirements of large displacement of the radiating surface and small deformation of materials, the present invention utilizes the oscillation of a rigid body to provide a large displacement without deformation, in combination with a configuration for converting a dipole oscillation of the rigid body to a monopole pulsation. Monopole pulsation provides much higher acoustic radiation than does dipole oscillation for small (as compared with sound wavelength) radiators.

Figure 1A:
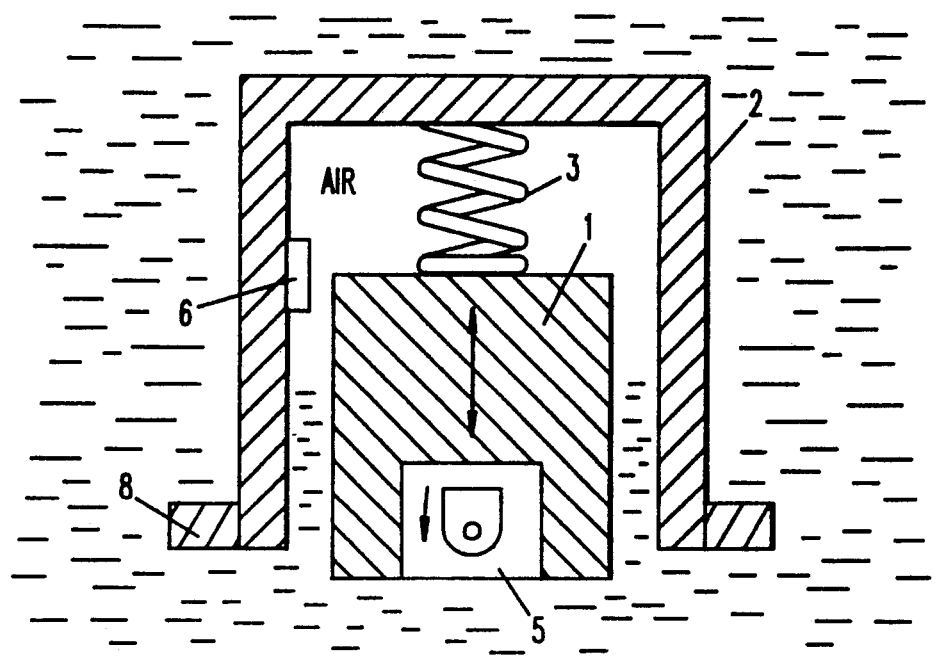
FIG. 1 is a schematic diagram depicting a low frequency underwater acoustic radiator in accordance with the invention.
Figure 1B:
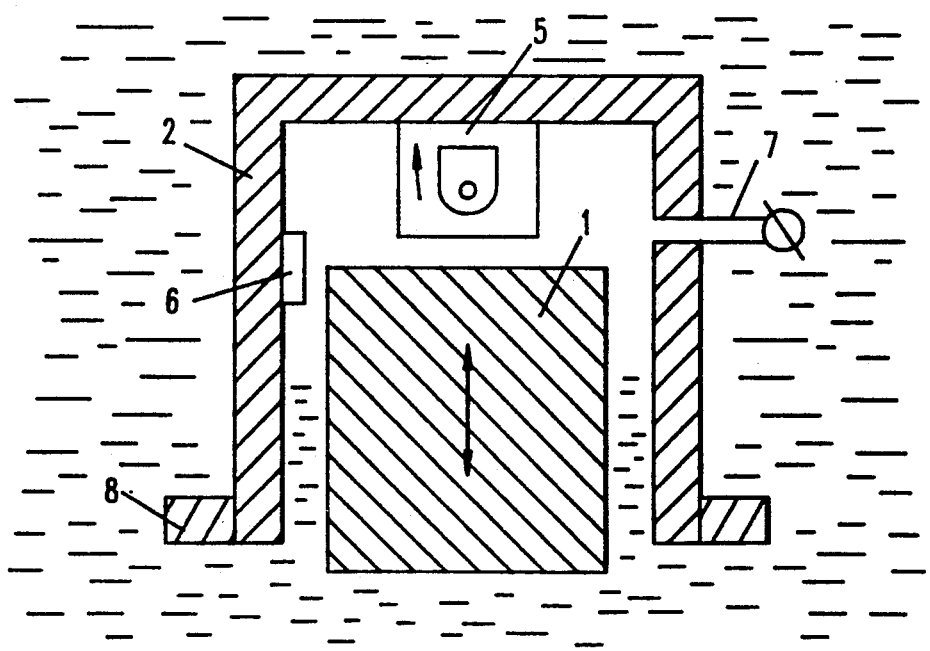

FIG. 1 depicts a low frequency underwater acoustic radiator in accordance with the invention. As illustrated in FIG. 1, element 1 is the oscillating rigid body or float element. Element 2 is the chamber, which can be constructed of steel. Element 3 is a spring element. As noted above, the spring element can include a separate coil spring or other compression spring, as depicted in FIG. 1A, or simply an air volume trapped within the cavity that has is characterized by an intrinsic own spring force. The latter configuration is depicted in FIG. 1B.

The chamber and float element are maintained in a vertical position in order with the open low portion of the chamber downward, to trap air within the float element. The substantially vertical orientation of the chamber is maintained by coupling ballast 8 (FIGS. 1A, 1B) to the exterior of the chamber to establish a center of mass for the pulsator assembly along an axis lower than the geometric center of the pulsator assembly. A screen or filter can be fitted to the bottom portion of the chamber to prevent infiltration of silt, sea organisms or other contaminants.

Figure 2:
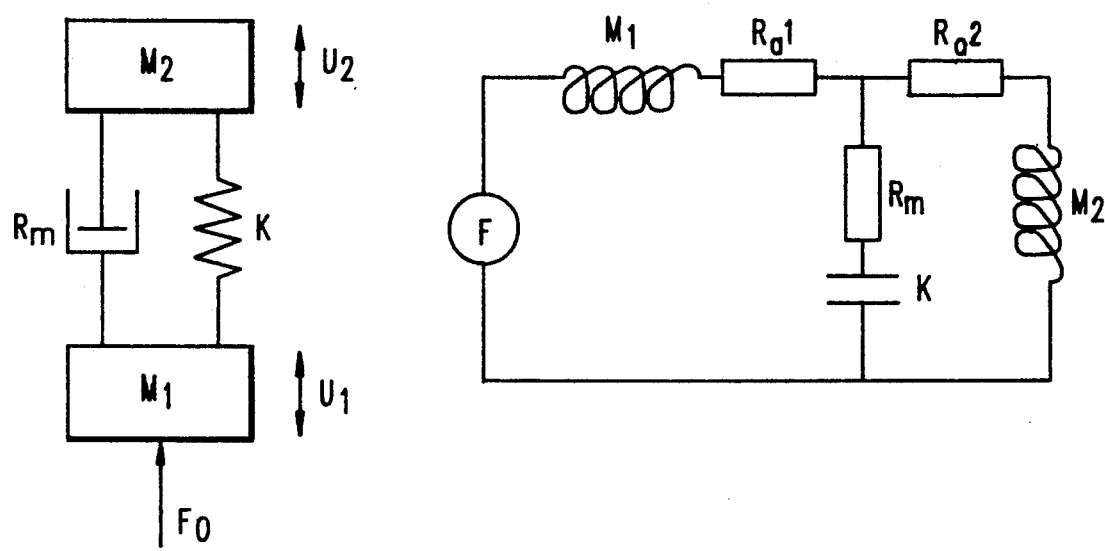
FIGS. 2A and 2B are schematic diagrams depicting the function of a low frequency underwater radiator in accordance with the invention in the context of mechanical and electrical analogs, respectively.

FIG. 2 depicts mechanical and electrical equivalents of the pulsator assembly, wherein $M_1$ is the mass of the float element plus its added mass of water, $M_2$ is the mass of the chamber plus its added mass of water, $F_o$ is the vibromotive force, k is the stiffness of the spring (or the air volume), $R_m$ is the mechanical resistance (descriptive of mechanical dissipation of energy in the system), and $R_{a1}$ and $R_{a2}$ are acoustic radiation resistances for the piston surfaces of the chamber and the rigid float element, respectively.

A generator 5 of vibromotive force F is placed inside the rigid float element or the chamber, and the force (or a component of force) is applied to the rigid float or the chamber in a vertical direction. While FIG. 1A depicts a vibromotive force generator 5 coupled to the float, FIG. 1B depicts a vibromotive force generator 5 coupled to the chamber.

The vibromotive force causes vertical oscillations (vibrations) of the coupled element, which may be the float or the chamber, and through the coupling of the spring (or the air volume), generates oscillation of both the chamber and the float. In particular, movement of a shaker mass within the float or in connection with the chamber causes relative movement of the other element, while the center of mass of the chamber-spring-float system remains substantially fixed. This system resonates with a frequency described by the following equation:

$$\omega_r = (\omega_1^2 + \omega_2^2)^{\frac{1}{2}} \qquad \text{(Eq. 1)}$$

where
$$\omega_{1,2}^2 = k/M_{1,2} \text{ and}$$

$\omega$ is the force frequency.

Those skilled in the art will appreciate that in the region of resonant operation, the oscillation velocities $u_1$ and $u_2$ of the chamber and the float have opposite signs:

$$u_2 = -(M_1/M_2)u_1 \qquad \text{(Eq. 2)}$$

Therefore, in the area of resonant operation, the invention provides methods and apparatus for the conversion of dipole oscillation of the rigid float to monopole pulsation of the float-spring-chamber system. The radiating surfaces (piston surfaces of the cup and the body) undergo no deformations.

Those skilled in the art will appreciate that three modes of operation will be possible. Where the combined mass of the chamber and the effective water load mass coupled to the chamber is nearly equal to the combined mass of the float and the effective water load mass coupled to the float, both the chamber and the float move with respect to each other during operation.

When the combined mass of the chamber and the effective water load mass coupled to the chamber is much greater than the combined mass of the float and the effective water load mass coupled to the float, the chamber will remain substantially stationary while the float moves.

When the combined mass of the chamber and the effective water load mass coupled to the chamber is much less than the combined mass of the float and the effective water load mass coupled to the float, the chamber will move while the float remains substantially stationary.

Generation of Vibromotive Force: Various methods can be employed to generate the vibromotive force. This can be effectuated by oscillation of a massive body, such as the debalanced eccentrics of an electric vibrator, within the rigid float element (FIG. 1A), or coupled to the chamber (FIG. 1B). Because of the high reliability requirement it is better (and less expensive) to employ mass-produced units produced in accordance with conventional engineering techniques. Various types of vibromotive force generators are commercially available.

An example of a vibromotive force generator is an electrically powered vibrator, utilized for imparting vibromotive force to bins, feeders, screeners, and other industrial assemblies. The bin vibrator is essentially an electric motor with debalanced eccentrics. One configuration is listed in the Tomas Register, vol. 14, 1989. This type of vibrator operates in an appropriate frequency range (up to 200 Hz) and is able to operate without maintenance for well over 10 years, thereby fulfilling the reliability requirement.

Another such vibrator is commercially available from The Cleveland Vibrator Company, Inc. ("CVC") of Cleveland Ohio. The CVC Model RE Rotary Electric Vibrator and the CVC Model RA Rotary Air Vibrator can be utilized in a practice of the invention.

Other types of vibromotive force generators can also be employed in connection with the invention. In particular, it is possible to use an electric linear motor, a low frequency electromagnetic or electrodynamic force exciter, or hydraulic or air powered vibrators, which are widely used in industry, in place of the electric motor vibrator.

The vibromotive generator can alternatively utilize elements for converting hydrodynamic excitation from water flow around the pulsator assembly, which may occur during towing or other external translational movement of the pulsator assembly, into vibromotive force. Such elements are described in the above-cited publication by J. E. Blue et al., "A Low-Frequency, Tow-Powered Sound Source", *Power Transducers for Sonics and Ultrasonics*, Proceedings of the International Workshop held in Toulon, France, Jun. 12 and 13, 1990, B. F. Hamonic et al., ed., Springer-Verlag, pub., pp. 178-185, the teachings of which are incorporated herein by reference. Acoustic Power: The following formula describes acoustic power output in the resonant region of operation for a radiator constructed in accordance with the invention:

$$W_a = (F_o^2 R_a)/4(R_a + 2R_m)^2 \qquad (Eq. 3)$$

where $R_a = 1/2(\rho c S)(ka)^2$ is the radiation resistance of piston having radius a, $S = \pi a^2$ is the area of the piston, $\rho$ is the density of water, c is the sound speed, and $F_o$ is the amplitude of the vibromotive force.

Numerical example: The following is a numerical example illustrative of the operation of a radiator constructed in accordance with the invention.

| For the following conditions: | |
| --- | --- |
| Frequency: | $\omega/2\pi = 70$ Hz |
| Radius of the pistons (substantially equal for chamber and float): | $a = 0.5$ m |
| Vibromotive force: | $F = 10^4$ Newtons (2200 pounds) |
| Under condition $R_m << R_a$, acoustic power output will be: | $W_a = 2000$ Watts |
| Corresponding Source Level: | SL = 204 dB re 1 $\mu$Pa × 1 meter |

Utilization of Air Volume as Spring: The stiffness k of the air volume is found from adiabatic equation of state:

$$k = \gamma P_o S/L \qquad (Eq. 4)$$

where S is the area of the horizontal section of the volume, L is the height of the volume, $P_o$ is the equilibrium pressure of the air (equal to the hydrostatic pressure of water), and $\gamma$ is the ratio of the specific heat of the air at constant pressure to its specific heat at constant volume.

Those skilled in the art will appreciate that $P_o$ and L are a function of depth of the submerged radiator. Accordingly, k and, correspondingly, resonant frequency $\omega r$ is also dependent upon depth H, as described by the following equation:

$$\omega_r = [2\gamma S P_{atm}(M_1+M_2)/M_1 M_2 L_o]^{\frac{1}{2}}(1+0.1H) \qquad (Eq. 5)$$

where $L_o$ is the height of the volume at (H=zero), and $P_{atm}$ is the atmospheric pressure.

This dependence upon submerged depth permits simply control of the resonant frequency of the radiator, by changing the depth at which the device is towed or otherwise submerged. This is accordingly a significant advantage of the invention.

It will thus be seen that the invention efficiently attains the objects set forth above, among those made apparent from the preceding description. In particular, the invention provides low frequency acoustic radiation methods and apparatus affording high reliability due to the avoidance of material deformation and the use of highly reliable mass-manufactured components and very simple construction. The invention also provides high radiated power in the low frequency range, high efficiency when using the air volume as a spring, because the air spring has minimum absorption resistance. Moreover, the invention enables simple control of resonant frequency by changing the air volume or changing the submerged depth, thereby attaining in one radiator both of the previously antithetical requirements of resonant operation of the radiator and broadband frequency performance. Air volume can be changed by introducing air into the chamber or by releasing air from the chamber through conventional conduit and valve elements 7 (FIG. 1B). Air can be supplied from an external reservoir such as a conventional scuba tank. A guide element 6 (FIG. 1A) attached to the inner surface of the cavity of the chamber can be utilized to maintain a selected attitude of the float within the chamber cavity or to maintain a selected gap between float and side walls of chamber cavity.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Low frequency acoustic radiator apparatus adapted for submerged operation in water, for generating a monopole pulsation from a dipole oscillation, the apparatus comprising
a chamber element having a top portion, a bottom portion, and
a side wall portion,
   said chamber element being open at the bottom portion and closed at the top portion,
   said top portion and said side walls defining a cavity in said chamber element,
   said chamber element having a mean density higher than that of water so that said chamber element sinks in water,
a float, disposed within said chamber element, for floating within said cavity when said chamber element and said float disposed therein are submerged in water in a selected first substantially vertical orientation with said bottom portion below said top portion,
   said float having a selected loose fit within said cavity to permit said float to oscillate within said cavity without substantial deformation or friction,
   said float being characterized by a mean density lower than that of water so that said float is buoyant in water within said cavity,
spring means, interposed between said top portion of said cavity and said float, for generating a spring force between said top portion of said cavity and said float so that said chamber element and said float are coupled through said spring means,
vibromotive means, coupled to one element from the group consisting of the float and the chamber, for imparting a vibromotive force having a substantially vertical component to the coupled element to generate oscillation of the coupled element,
   said oscillation of said coupled element acting upon the other coupled element through said spring means to generate monopole pulsation.

2. Apparatus according to claim 1
wherein said cavity is adapted for trapping a volume of air therein when said chamber element is submerged in water with said selected first substantially vertical orientation, and wherein said spring means comprises said volume of trapped air.

3. Apparatus according to claim 1 wherein said float is substantially non-deformable.

4. Apparatus according to claim 1 further comprising means, coupled to the chamber element, for maintaining said selected first substantially vertical orientation of said chamber element.

5. Apparatus according to claim 4, wherein said means for maintaining said selected first substantially vertical orientation of said chamber element includes for establishing a center of mass of said pulsator means lower than the geometric center of said pulsator means.

6. Apparatus according to claim 5, wherein said means for establishing a center of mass of said pulsator means lower than a geometric center of said pulsator means includes ballast elements coupled to said chamber element.

7. Apparatus according to claim 1 wherein said vibromotive means includes an electric motor vibrator.

8. Apparatus according to claim 1 wherein said vibromotive means includes a linear motor.

9. Apparatus according to claim 1 wherein said vibromotive means includes a low frequency electromagnetic or electrodynamic force exciter.

10. Apparatus according to claim 1 wherein said vibromotive means includes any of a hydraulic vibrator or a pneumatic vibrator.

11. Apparatus according to claim 1 wherein said vibromotive means includes means for converting hydrodynamic excitation from water flow about the pulsator means caused by external translational movement of the pulsator means into vibromotive force.

12. Apparatus according to claim 1 wherein said spring means comprises a discrete spring element.

13. Apparatus according to claim 2
wherein said apparatus has a resonant frequency, and further comprising means for changing a resonant frequency of said apparatus.

14. Apparatus according to claim 12
wherein said apparatus has a resonant frequency, and further comprising means for changing a resonant frequency of said apparatus.

15. Apparatus according to claim 13 wherein said means for changing resonant frequency includes means, responsive to depth of water at which said pulsator means is submerged, for changing spring constant of said spring means.

16. Apparatus according to claim 13 wherein said means for changing resonant frequency includes means for changing the volume of air in said cavity.

17. Apparatus according to claim 13 wherein said means for changing the volume of air trapped between said float and said chamber element includes means for introducing air into or releasing air from said cavity from an external air source.

18. Apparatus according to claim 1 wherein said apparatus operates within a frequency range between a fraction of a hertz and hundreds of hertz.

19. Apparatus according to claim 1 further comprising guide means, coupled to the cavity, for maintaining a substantially constant attitude of said float within said cavity.

* * * * *